Feb. 16, 1960
W. P. MURPHY
2,925,164
TYPEWRITER SPOOL STANDARDIZATION
Filed Dec. 30, 1955
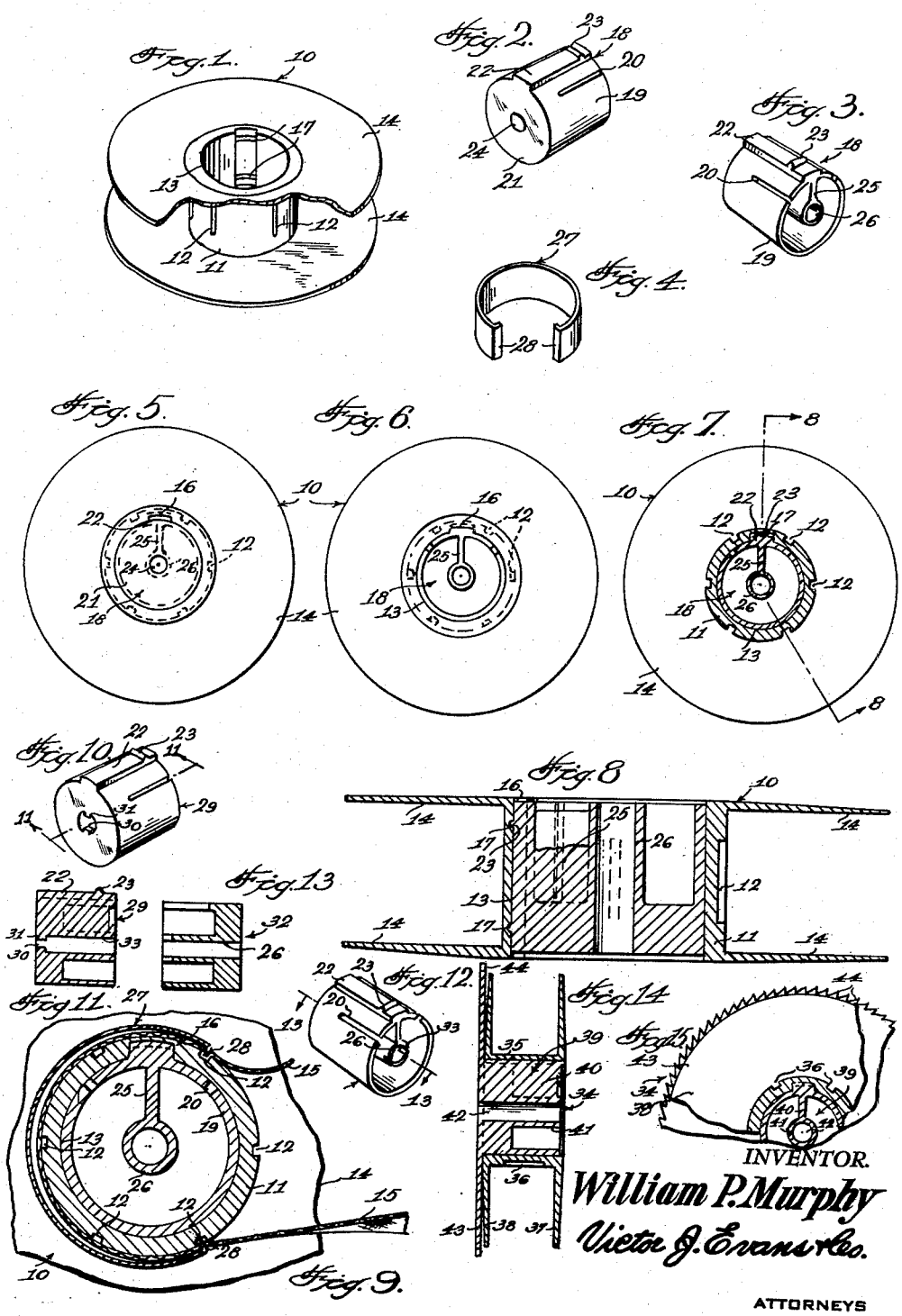
INVENTOR.
William P. Murphy
Victor J. Evans & Co.
ATTORNEYS United States Patent Office 2,925,164
Patented Feb. 16, 1960

2,925,164

TYPEWRITER SPOOL STANDARDIZATION

William P. Murphy, Falls Church, Va.

Application December 30, 1955, Serial No. 556,590

1 Claim. (Cl. 197—175)

This invention relates to office machines or equipment, and more particularly to a typewriter or the like.

The object of the invention is to provide a ribbon spool for office machines such as typewriters whereby the spool is of standard construction.

Another object of the invention is to provide a spool and adapter for use with office machines such as typewriters whereby the replacement of ribbons can be more easily accomplished and with less cost.

A further object of the invention is to provide a ribbon spool and adapter which is extremely simple and inexpensive to manufacture.

Other objects and advantages will be apparent during the course of the following description.

In the accompanying drawings, forming a part of this application and in which like numerals are used to designate like parts throughout the same.

Figure 1 is a perspective view of the spool, with parts broken away and in section.

Figure 2 is a perspective view of the adapter.

Figure 3 is a perspective view of the adapter of Figure 2 looking at the opposite end thereof.

Figure 4 is a perspective view of the spring clips for maintaining the ribbon on the spool.

Figure 5 is a side elevational view of the spool of Figure 1.

Figure 6 is a view looking at the opposite side from Figure 5.

Figure 7 is a sectional view taken through the spool and adapter.

Figure 8 is a sectional view taken on the line 8—8 of Figure 7.

Figure 9 is a fragmentary sectional view illustrating the spring clip for retaining the ribbon on the spool.

Figure 10 is a perspective view of a modified adapter.

Figure 11 is a sectional view taken on the line 11—11 of Figure 10.

Figure 12 is a perspective view of a further modified adapter.

Figure 13 is a sectional view taken on the line 13—13 of Figure 12.

Figure 14 is a sectional view taken through a modified spool and adapter.

Figure 15 is an elevational view of the spool and adapter of Figure 14.

Referring in detail to the drawings, the numeral 10 designates a spool or reel which includes a cylindrical hub 11 that is provided with a plurality of spaced parallel indentations 12 on its outer surface, Figure 1. The spool 10 further includes a pair of spaced parallel circular plates or wall members 14, and the wall members 14 may be formed integral with or secured to the hub 11. A ribbon 15 which may be a typewriter ribbon is adapted to be arranged in engagement with the hub 11, Figure 9, and the inner surface of the hub 11 is provided with a groove 16 for a purpose to be later described. Arranged in the hub 11 are a pair of spaced parallel recesses 17 which extend transversely with respect to the longitudinal axis of the groove 16, and the recesses 17 communicate with the groove 16.

The assembly of the present invention further includes an adapter which is indicated generally by the numeral 18, Figure 2, and the adapter 18 includes a cylindrical side wall 19 which is provided with a plurality of spaced parallel slits 20. The slits 20 insure that the adapter 18 will have the desired amount of resiliency so that it can be made to conform to the central opening 13 in the hub 11. The adapter 18 further includes an end wall 21, while the opposite end of the adapter 18 is open as shown in Figure 3. The adapter 18 is further provided with a longitudinally extending tongue 22 which extends outwardly from the outer surface of the side wall 19, and the tongue 22 is provided with a transverse lip 23 which is adapted to engage one of the recesses 17 in the hub 11. The end wall 21 is provided with the aperture 24 which is arranged centrally therein.

Extending inwardly from the side wall 19 of the adapter 18 is a flange 25 which has a cylindrical body member 26 secured thereto, Figure 3. The body member 26 is adapted to receive the usual spindle of the typewriter or the like.

A means is provided for retaining the ribbon 15 on the spool 10, and this means comprises a curved or arcuate spring clip 27 which has its end portions bent inwardly as at 28 so as to define lugs for engaging the indentation 12 in the hub 11. The tongue 22 is adapted to be snugly seated in the groove 16 of the hub 11.

Referring to Figures 10 and 11 of the drawings, there is shown a slightly modified adapter which is indicated generally by the numeral 29, and the adapter 29 differs from the adapter 18 in that the adapter 29 has an aperture 30 which has a pair of diametrically opposed teeth 31 contiguous thereto so that the adapter 29 can be mounted on office machines which have recesses for said teeth 31.

Referring to Figures 12 and 13 of the drawings there is shown a still further modified adapter which is indicated by the numeral 32, and the adapter 32 includes a pair of spaced parallel cutouts or slits 33 in the body member 26.

Referring to Figures 14 and 15 of the drawings there is shown a still further modified assembly which is indicated generally by the numeral 34. The member 34 shown in Figures 14 and 15 includes a hub 35 of cylindrical construction which has a first wall member 37 extending outwardly from an end thereof, and there is further provided a second wall member 38 which is arranged in spaced parallel relation with respect to the wall member 37. The hub 35 is provided with a plurality of spaced parallel indentations 36 for engagement by the lugs 28 of the spring clips 27. Arranged within the hub 35 is an adapter 39 which includes a flange 40 that has a cylindrical body member 41 secured to the inner end thereof, and the body member 41 is provided with a passageway or bore 42 for receiving the usual spindle of a typewriter or the like. Secured to an end of the adapter 39 or formed integral therewith, is a plate 43, and extending from the outer periphery of the plate 43 is a plurality of teeth 44, and the teeth 44 engage the usual operating mechanism of a typewriter.

From the foregoing, it is apparent that there has been provided a spool and adapter for use with office machines such as typewriters and in use, an adapter such as the adapter 18 may be mounted in the hub 11 of the spool 10. The tongue 22 is snugly seated in the groove 16, and the lip 23 engages one of the recesses 17 so that the adapter 18 is retained snugly within the hub 11. The hollow body member 26 receives the usual spindle of the typewriter or other machine. The spring clip 27 can be readily positioned on or removed off of the hub 11, and the lugs 28 engage the indentations 12 so as to maintain the ribbon 15 detachably mounted on the hub. The slits 20 in the side wall 19 of the adapter 18 provide flexibility or yieldability for the side wall so that the adapter can be readily positioned in the hub. The adapter may be constructed of any suitable material such as plastic, and the adapter may include the inwardly projecting teeth 31 so that when the device is mounted on the typewriter which has recesses in the spindle, the teeth 31 will engage such recesses. Also, the adapter may be constructed as shown in Figures 12 and 13 so that it may be provided with cutouts 33 for accommodating projections on certain types of machine. In Figures 14 and 15 the device includes the spool and adapter which are connected together as a unitary device. The indentations 36 again are adapted to receive the lugs 28 of the spring clip 27, and the passageway 42 in the body member 41 is adapted to receive the spindle of the typewriter or other machine.

From the foregoing, it is apparent that there has been provided an improvement for use in office machine writing equipment such as typewriters. The present invention can be used on any ribbon writing or numbering machine with a slight change in size of the parts and the present invention is specifically directed to the construction of the ribbon spool and adapter. Most office machine manufacturers require a different type spool for each different machine, since the spool is usually constructed to accomplish a rewind action when the ribbon reaches the end on one spool. Thus, any one using, selling, manufacturing or carrying an inventory of ribbons must have a different spool to fit the individual requirements of each machine, there being approximately fifty well known spools currently being used. The present invention eliminates the necessity of maintaining such a large inventory and the present invention includes or is directed to the spool 10 and an aadpter such as the adapter 18. The adapter may be made of any suitable material such as plastic and the adapter 18 is provided with a tongue 22 which fits snugly in the groove 16 of the hub 11 of the standard spool 10. The adapter 18 is further provided with surfaces which fit the various types of machines that may be required such as oblong holes, square holes, keyways and protrusions. In other words, the adapter is molded to fit all of the machine requirements, and the adapter can be reused together with a standard spool. While the ribbon such as the ribbon 15 can be attached to the spool in any suitable manner, preferably the ribbon is held in place by means of the spring clip 27, and the ribbon is attached to the spool in such a manner that it can be wound in both directions. The lugs 28 snap into the indentation 12 so as to lock the ribbon to the spool.

The spool is of standard construction and the adapter permits the use of the spool on all machines. Thus, one spool can be made to fit all of the various types of machines, and the parts can be readily assembled or disassembled without requiring any special tool. Furthermore, the present invention eliminates the necessity of changing the winding mechanism for various types of machines during the manufacture of the ribbon. By having a standard spool, the necessity of having a large inventory of spools is eliminated. The adapter is of a size to snugly fit within the spool. The various modified adapters 29 and 32 show how the adapter can be modified slightly to fit various types of spindles and reversing mechanisms of different typewriters.

The spool can be made of one piece of material or it can be stamped from several pieces of material. The spool can be connected to the adapter without any special tools and the spring clip 27 permits the ready removal or replacement of the ribbon on the spool. Due to the provision of the interlocking tongue and groove on the adapter and spool, there will be no accidental slippage between the parts. The outer surface of the adapter fits the standard spool, but the inner portion of the adapter may be modified to fit the various spindles or reversing mechanisms. The slits 33 in the adapter 32 permit the adapters to be used with an L. C. Smith machine, while the teeth 31 of the adapter 29 permit the adapter 29 to be used with electric types of machines.

I claim:

In a device of the character described, a hub, a pair of wall members extending outwardly from the ends of said hub, an adapter snugly fitted in said hub, said hub being provided with a groove, said adapter having a tongue which fits snugly in the groove of the hub, said adapter further including an inwardly extending flange, a cylindrical body member on the inner end of said flange, and a plate on an end of said adapter having a plurality of spaced apart teeth.

References Cited in the file of this patent

UNITED STATES PATENTS

| | | |
|---|---|---|
| 1,204,827 | Schroeder | Nov. 14, 1916 |
| 2,615,643 | Barsam | Oct. 28, 1952 |

FOREIGN PATENTS

| | | |
|---|---|---|
| 806,620 | France | Sept. 28, 1936 |
| 241,619 | Great Britain | Oct. 21, 1925 |